(12) United States Patent
Katougi (10) Patent No.: US 8,000,544 B2
(45) Date of Patent: Aug. 16, 2011

(54) IMAGE PROCESSING METHOD, IMAGE PROCESSING APPARATUS AND RECORDING MEDIUM

(75) Inventor: Terumitsu Katougi, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 877 days.

(21) Appl. No.: 12/018,073

(22) Filed: Jan. 22, 2008

(65) Prior Publication Data
US 2008/0175493 A1   Jul. 24, 2008

(30) Foreign Application Priority Data
Jan. 23, 2007   (JP) .................... 2007-013093

(51) Int. Cl.
*G06K 9/36* (2006.01)
*G06K 9/46* (2006.01)
*H04N 1/40* (2006.01)

(52) U.S. Cl. ........................ 382/237; 358/3.01
(58) Field of Classification Search .......... None
See application file for complete search history.

(56) References Cited

U.S. PATENT DOCUMENTS

| | | | | |
|---|---|---|---|---|
| 5,384,647 A * | 1/1995 | Fukushima | ................ | 358/2.1 |
| 6,122,070 A * | 9/2000 | Kang et al. | ................ | 358/1.9 |
| 7,570,824 B2 * | 8/2009 | Katougi et al. | ................ | 382/239 |
| 7,692,817 B2 * | 4/2010 | Katohgi | ................ | 358/3.03 |
| 7,701,614 B2 * | 4/2010 | Yamazaki | ................ | 358/3.03 |
| 7,742,195 B2 * | 6/2010 | Kakutani | ................ | 358/3.13 |
| 7,791,764 B2 * | 9/2010 | Kubota | ................ | 358/2.1 |
| 7,809,205 B2 * | 10/2010 | Katougi | ................ | 382/248 |
| 2005/0286791 A1 * | 12/2005 | Katohgi | ................ | 382/252 |
| 2006/0238814 A1 * | 10/2006 | Murakami | ................ | 358/3.14 |

FOREIGN PATENT DOCUMENTS

| | | |
|---|---|---|
| JP | 2000-261669 A | 9/2000 |
| JP | 2001-292319 A | 10/2001 |

OTHER PUBLICATIONS

Akahori, et al. "Development of High-Image-Quality Binary Error Diffusion Algorithm", Konica Minolta Technology Report vol. 2, pp. 73-76. (2005).

* cited by examiner

*Primary Examiner* — Yuzhen Ge
(74) *Attorney, Agent, or Firm* — Birch, Stewart, Kolasch & Birch, LLP (57) ABSTRACT

When generating output image data represented by a reduced number of gray levels from gray level image data, an image processing apparatus subtracts a pixel value of a selected pixel from a pixel value of adjacent pixel, amplifies the reduced value obtained by the subtraction, adds the amplified value to a numerical value in a numerical matrix, and finds a pixel value in the output image data represented by a reduced number of gray levels of pixel values, based on a value obtained by further adding a value obtained by adding the amplified value to the numerical value in the numerical matrix to a predetermined value.

14 Claims, 6 Drawing Sheets

IMAGE PROCESSING METHOD, IMAGE PROCESSING APPARATUS AND RECORDING MEDIUM

CROSS-REFERENCE TO RELATED APPLICATION

This non-provisional application claims priority under 35 U.S.C. §119(a) on Patent Application No. 2007-013093 filed in Japan on Jan. 23, 2007, the entire contents of which are hereby incorporated by reference.

BACKGROUND

1. Technical Field

The present invention relates to an image processing method, an image processing apparatus and a recording medium for performing image processing for adjusting the gray levels of image data which are the basis of an image to express gray levels when forming the image.

2. Description of Related Art

Various types of image forming techniques, such as a thermal transfer, an electrophotographic or an inkjet technique, are used in image forming apparatuses such as copying machines or printers for forming images on a record carrier such as paper. With these image forming techniques, since it is almost impossible to express gray levels for each pixel unit, a halftone reproduction technique is used to locally change the ratio of colored pixels and thereby express the gray levels of an image. For example, when forming a gray level image with black and while binary values, the ratio of black pixels is increased in a deeper color area and the ratio of black pixels is decreased in a lighter color area, so that an image with color shading perceivable by the naked eye is formed. In image data created using a camera, an image processing program etc., the pixel values are expressed by gray levels. Therefore, in order to form an image based on the image data, it is necessary to perform image processing for converting the pixel values into values capable of realizing halftone reproduction.

Conventionally, various techniques have been developed as techniques for performing such image processing. The technique disclosed in Japanese Patent Application Laid-Open No. 2000-261669 uses a dithering method in which image processing is performed using a threshold matrix composed of a plurality of thresholds arranged in a matrix form. With the dithering method using a threshold matrix, the pixel values in the image data and the thresholds in the threshold matrix correspond to each other on a one-by-one basis, and the pixel values are converted into values of fewer gray levels, such as binary values, by comparing the pixel values with the threshold. The Japanese Patent Application Laid-Open No. 2000-261669 discloses a technique for creating an appropriate threshold matrix. A technique disclosed in "Development of High-Image-Quality Binary Error Diffusion Algorithm", Kazuyoshi Noguchi, Taisuke Akahori, Konica Minolta Technology Report VOL. 2, 2005, p. 73-76 uses an error diffusion method in which an error between a pixel value in the image data and a pixel value after conversion into a fewer gray level value is distributed to neighboring errors.

SUMMARY

However, when an image is formed using the halftone reproduction technique, there is a problem that blurriness and distortion of edges occur in the text contained in the image. Although a technique for solving this problem is disclosed in "Development of High-Image-Quality Binary Error Diffusion Algorithm", Kazuyoshi Noguchi, Taisuke Akahori, Konica Minolta Technology Report VOL. 2, 2005, p. 73-76, there is still a problem that a lot of calculation resources are necessary to perform image processing using an error diffusion method. Moreover, although a technique for reducing periodic patterns caused by the size of the threshold matrix is disclosed in the Japanese Patent Application Laid-Open No. 2000-261669, a technique for reducing the blurriness and distortion of edges is not disclosed.

With the aim of solving the above problems, and it is an object to provide an image processing method, an image processing apparatus and a recording medium capable of forming an image represented by a reduced number of gray levels while improving the reproducibility of edges by suppressing occurrence of blurriness and distortion of edges even with the use of a dithering method.

An image processing method according to a first aspect is characterized by an image processing method for performing image processing for reducing the number of gray levels of image data, comprising the steps of: storing a numerical matrix composed of predetermined numerical values which are arranged in a matrix form and correspond to pixels, respectively, which are arranged in an image represented by the image data; selecting successively each of the pixels in the image represented by the image data; calculating a difference between a pixel value of a selected pixel and a pixel value of a pixel adjacent to the selected pixel; converting the calculated difference by a predetermined conversion method; adding the converted value to a numerical value in the numerical matrix corresponding to the selected pixel; and processing the pixel value of the selected pixel based on a value obtained by the addition to find a pixel value represented by a reduced number of gray levels for the pixel value.

An image processing apparatus according to a second aspect is characterized by an image processing apparatus for generating output image data represented by a reduced number of gray levels of image data, comprising: a storing section for storing a numerical matrix composed of predetermined numerical values which are arranged in a matrix form and correspond to pixels, respectively, which are arranged in an image represented by the image data; a calculating section for selecting successively each of the pixels in the image represented by the image data and calculating a difference between a pixel value of a selected pixel and a pixel value of a pixel adjacent to the selected pixel; a converting section for converting the difference calculated by the calculating section by a predetermined conversion method; an adding section for adding a converted value given by the converting section to a numerical value in the numerical matrix corresponding to the selected pixel; and a processing section for processing the pixel value of the selected pixel based on a value obtained by the addition to find a pixel value in output image data represented by a reduced number of gray levels of the pixel values.

An image processing apparatus according to a third aspect is characterized in that said calculating section calculates the difference by subtracting the pixel value of the selected pixel from the pixel value of the adjacent pixel, and said converting section converts the difference calculated by said calculating section by amplifying the difference at a predetermined amplification rate.

An image processing apparatus according to a fourth aspect is characterized in that a spatial distribution of the numerical values arranged in the numerical matrix has blue noise characteristics.

An image processing method according to a fifth aspect is characterized by further comprising an image forming section for forming an image based on the generated output image data.

A recording medium according to a sixth aspect is characterized by a recording medium readable by a computer and storing a computer program for causing a computer, which stores a numerical matrix composed of predetermined numerical values arranged in a matrix form and correspond to pixels, respectively, which are arranged in an image represented by image data, to generate output image data represented by a reduced number of gray levels of the image data, the computer program performing a method comprising: a step of causing the computer to select successively each of the pixels in the image represented by the image data; a step of causing the computer to calculate a difference between a pixel value of a selected pixel and a pixel value of a pixel adjacent to the selected pixel; a step of causing the computer to convert the calculated difference by a predetermined conversion method; a step of causing the computer to add the converted value to a numerical value in the numerical matrix corresponding to the selected pixel; and a step of causing the computer to process the pixel value of the selected pixel based on a value obtained by the addition to find a pixel value in output image data represented by a reduced number of gray levels of the pixel values.

In the first, second and sixth aspects, in order to reduce the number of gray levels of pixel values contained in image data, the image processing apparatus arranges the numerical values of an image represented by the image data and the numerical values contained in a numerical matrix to correspond to each other, adds a value obtained by converting the difference between the pixel value of a selected pixel and the pixel value of adjacent pixel by a predetermined conversion method to the numerical value in the numerical matrix, and performs the process of reducing the number of gray levels to two gray levels etc., based on a value obtained by the addition. Since the difference between the pixel values is reflected in the value obtained by the addition process, if there is a large difference between the pixel values, the value obtained by the addition changes largely, and thus there is a high possibility that a large difference between the pixel values is maintained even after the reduction of the number of gray levels.

In the third aspect, when processing the pixel values, the image processing apparatus adds a value obtained by amplifying a reduced value obtained by subtracting the pixel value of a selected pixel from the pixel value of adjacent pixel to the numerical value in the numerical matrix and processes based on the value obtained by adding the amplified value to the numerical value in the numerical matrix corresponding to the selected pixel. When the pixel value of the selected pixel is increased more than adjacent pixel, the reduced value is negative and the level of the value obtained by the addition decreases. On the other hand, when the pixel value of the selected pixel is decreased more than adjacent pixel, the reduced value is positive and the level of the value obtained by the addition increases.

In the fourth aspect, with the use of a blue noise mask having blue noise characteristics as the numerical matrix for locally changing the value obtained by the addition from a predetermined value, it becomes difficult to perceive with the naked eye the periodic components contained in the spatial distribution of the value obtained by the addition.

In the fifth aspect, the image processing apparatus forms an image based on output image data represented by a reduced number of gray levels of the pixel values.

In the first, second and sixth aspects, when reducing the number of gray levels of the pixel values contained in the image data, the difference between the pixel values of a selected pixel and adjacent pixel is reflected in a value obtained by the addition. Therefore, if there is a large difference between the pixel values, the value obtained by the addition changes largely, and there is a high possibility that a large difference between the pixel values is maintained even after the reduction of the number of gray levels. A portion where the difference between the pixel values of the selected pixel and adjacent pixel is large in the image is an edge portion contained in the image. Thus, if the large difference between the pixel values is maintained even after the reduction of the number of gray levels, it is possible to suppress occurrence of blurriness and distortion of edges even after the reduction of the number of gray levels. Accordingly, the reproducibility of edges contained in the image formed based on the generated output image data is improved. Moreover, since the reduction of the number of gray levels is performed using a dithering method without using an error diffusion method, it is possible to reduce calculation resources required for forming an image with improved edge reproducibility.

In the third aspect, when the pixel value of the selected pixel is increased more than adjacent pixel, the level of the value obtained by the addition decreases, and there is a high possibility that the pixel value after the reduction of the number of gray levels is higher than the pixel value of adjacent pixel. On the other hand, when the pixel value of the selected pixel is decreased more than adjacent pixel, the level of the value obtained by the addition increases, and there is a high possibility that the pixel value after the reduction of the number of gray levels is lower than the pixel value of adjacent pixel. Therefore, the reproducibility of edges contained in the image formed based on output image data represented by a reduced number of gray levels is improved.

In the fourth aspect, since it becomes difficult to perceive with the naked eye the periodic components contained in the spatial distribution of the value obtained by the addition for use in the processing, the periodic noise is hard to observe from the spatial distribution of the pixel values contained in the image formed by reducing the number of gray levels, and thus it is possible to form a high-quality image.

Further, in the fifth aspect, since an image is formed based on output image data represented by a reduced number of gray levels of the pixel values, it is possible to provide advantageous effects, such as making it possible to form a high-quality image with improved edge reproducibility at low costs or in a short time.

The above and further objects and features will more fully be apparent from the following detailed description with accompanying drawings.

DETAILED DESCRIPTION

The following will specifically explain some embodiments based on the drawings.

Embodiment 1

Figure 1:
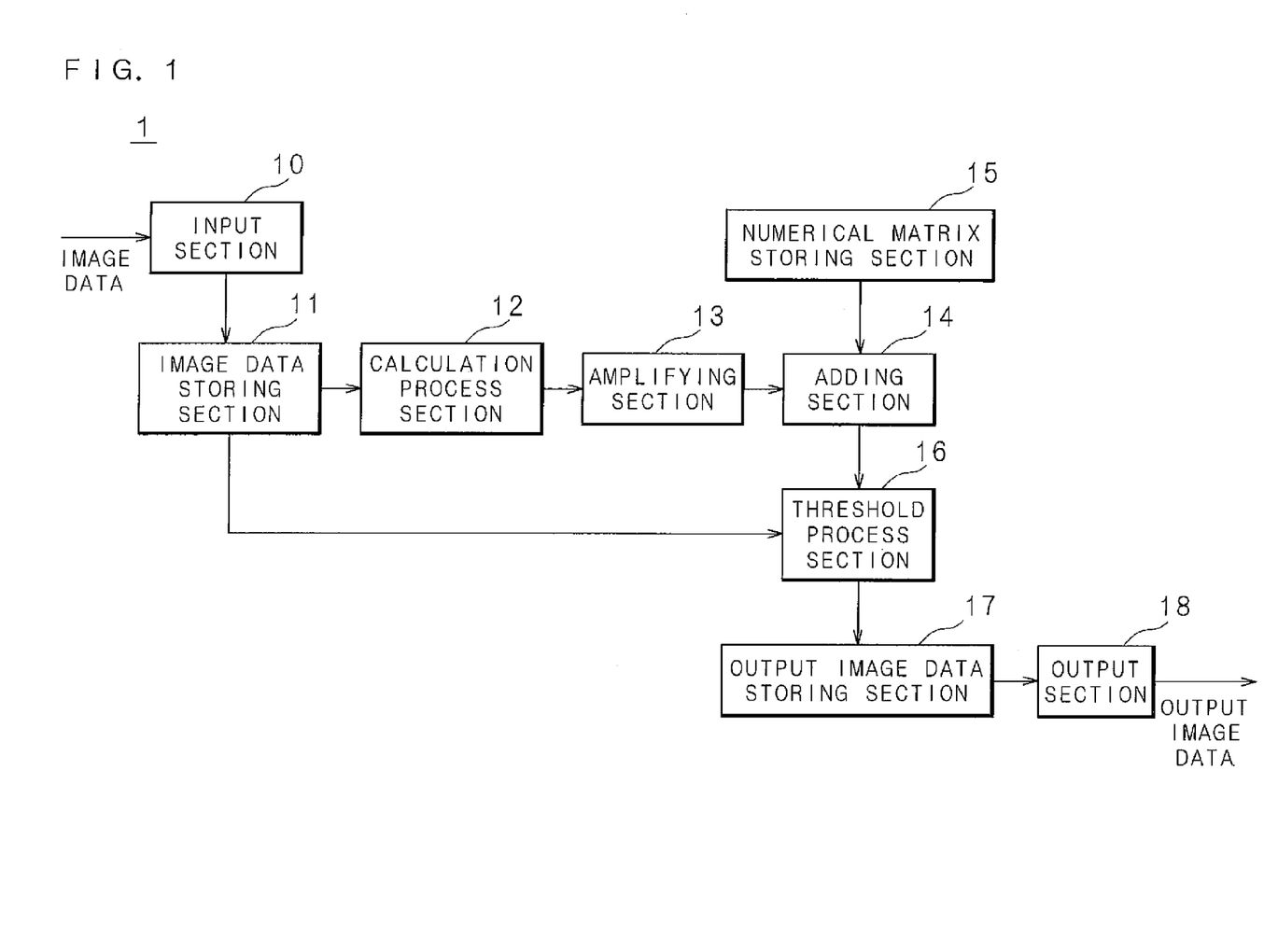
FIG. 1 is a block diagram showing the internal functional structure of an image processing apparatus according to Embodiment 1.

FIG. 1 is a block diagram showing the internal functional structure of an image processing apparatus 1 according to Embodiment 1. The image processing apparatus 1 according to Embodiment 1 is installed in a printer, a printer server etc., supplied with gray level image data from a PC, a digital camera, a scanner etc. and generates output image data represented by a reduced number of gray levels. The image data represents an image composed of pixels arranged in a two-dimensional matrix form including horizontal lines (X direction) and vertical lines (Y direction), and includes pixel values of the respective pixels expressed by gray levels. X indicates a position on a horizontal line in the image and Y shows a position on a vertical line in the image. It is supposed in the following explanation that the image data is mainly monochrome 256-gray level image data, and the output image data is 4-gray level data in which the pixel values are 0, 85, 170 or 255.

The image processing apparatus 1 comprises an input section 10 which is an interface into which image data is inputted and connected to an image data storing section 11 for storing the inputted image data. Connected to the image data storing section 11 is a calculation process section (calculating means) 12 for calculating the difference between the pixels values of adjacent pixels. The calculation process section 12 comprises a buffer memory for storing a predetermined number of pixel values, and performs the process of selecting a pixel contained in an image represented by the image data stored in the image data storing section 11, storing the pixel value of the selected pixel in the buffer memory and calculating the difference between the pixel values of adjacent pixels. The calculation process section 12 is connected to an amplifying section (converting means) 13 for converting into an amplified value by amplifying the difference between the pixel values calculated by the calculation process section 12 at a predetermined amplification rate. Further, the image processing apparatus 1 comprises a numerical matrix storing section 15 which is a memory for storing a numerical matrix including predetermined numerical values arranged in a two-dimensional matrix form. Connected to the amplifying section 13 and numerical matrix storing section 15 is an adding section 14 for adding the amplified value converted by the amplifying section 13 to a numerical value in the numerical matrix.

The adding section 14 is connected to a threshold process section 16 connected to the image data storing section 11. The threshold process section 16 performs a threshold process for reducing the number of gray levels of the pixel values contained in the image data based on the added value given by the adding section 14 to find pixel values of output image data represented by four gray levels. The threshold process section 16 is connected to an output image data storing section 17 for storing the output image data including the pixel values obtained by the threshold process section 16. The output image data storing section 17 is connected to an output section 18 for outputting the output image data. The output section 18 outputs the output image data to an image forming section in the apparatus in which the image processing apparatus 1 is installed or an external printer. The image processing apparatus 1 also comprises a controller, not shown, and the controller controls the operations of the respective sections constituting the image processing apparatus 1.

Figure 2:
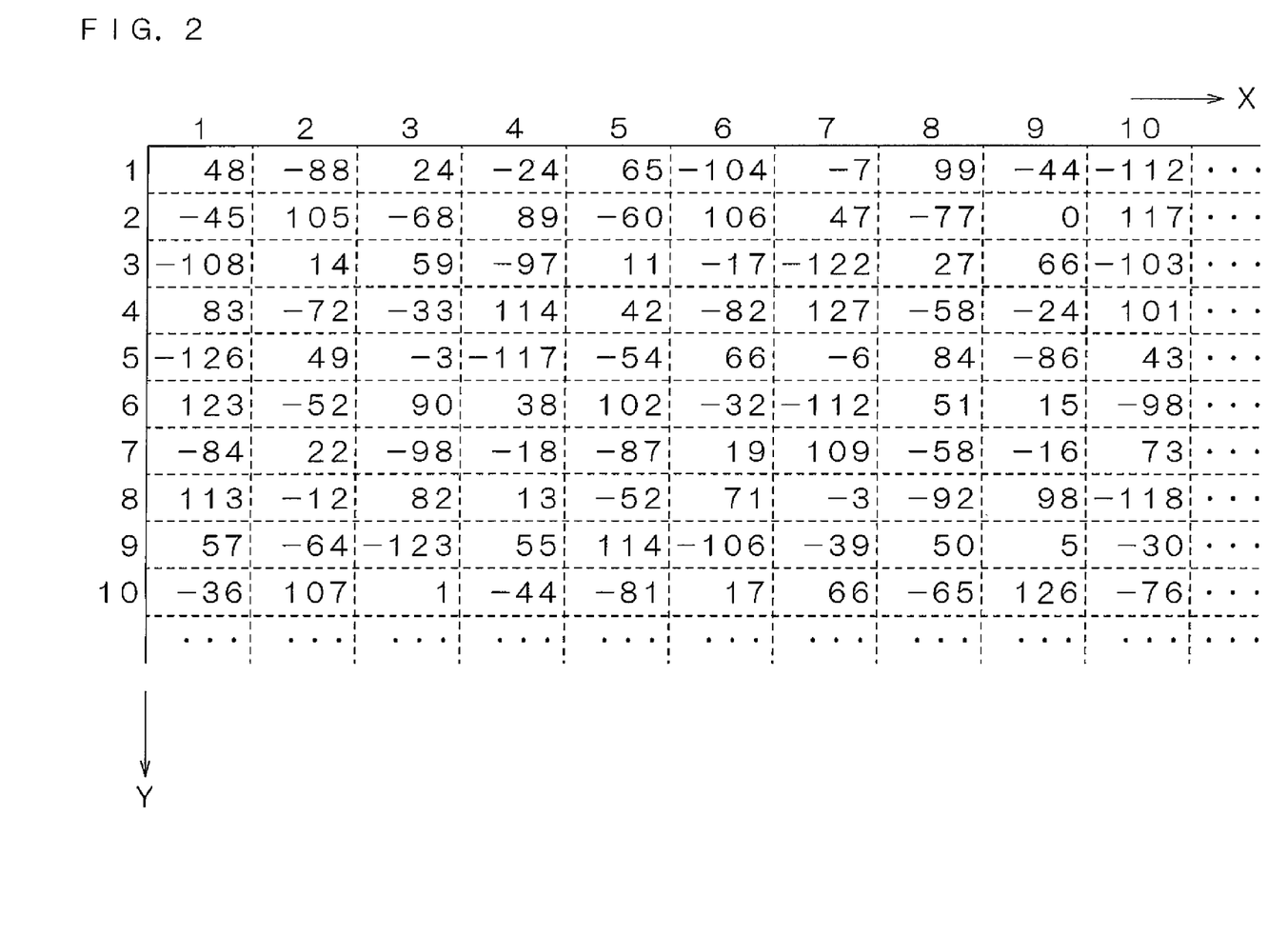
FIG. 2 is a conceptual view showing an example of a numerical matrix stored in a numerical matrix storing section.

FIG. 2 is a conceptual view showing an example of the numerical matrix stored in the numerical matrix storing section 15. The numerical matrix is composed of predetermined numerical values arranged in a two-dimensional matrix form. The horizontal direction of the numerical matrix is denoted as the X direction and the vertical direction is denoted as the Y direction. In FIG. 2, although only a 10×10 portion is shown, the numerical matrix has a certain size, such as, for example, 128×128 or 256×256, or larger. The spatial distribution of numerical values included in the numerical matrix has blue noise characteristics including a lot of spatial frequency components that are difficult to be perceived by the naked eye. In general, it is difficult to perceive spatial frequency components equal to or higher than a certain spatial frequency with the naked eye, and blue noise characteristics mean that the numerical matrix contains a greater amount of spatial frequency components of higher frequency than spatial frequency components which are easily perceived by the naked eye. A numerical matrix having blue noise characteristics is called a blue noise mask. A blue noise mask is obtained by generating an array in which main components of spatial frequency are distributed to a band range equal to or greater than a visual cutoff frequency by manipulating a pseudo random array of numerical values. The numerical matrix can be of other size, such as 1024×1024.

Figure 3:
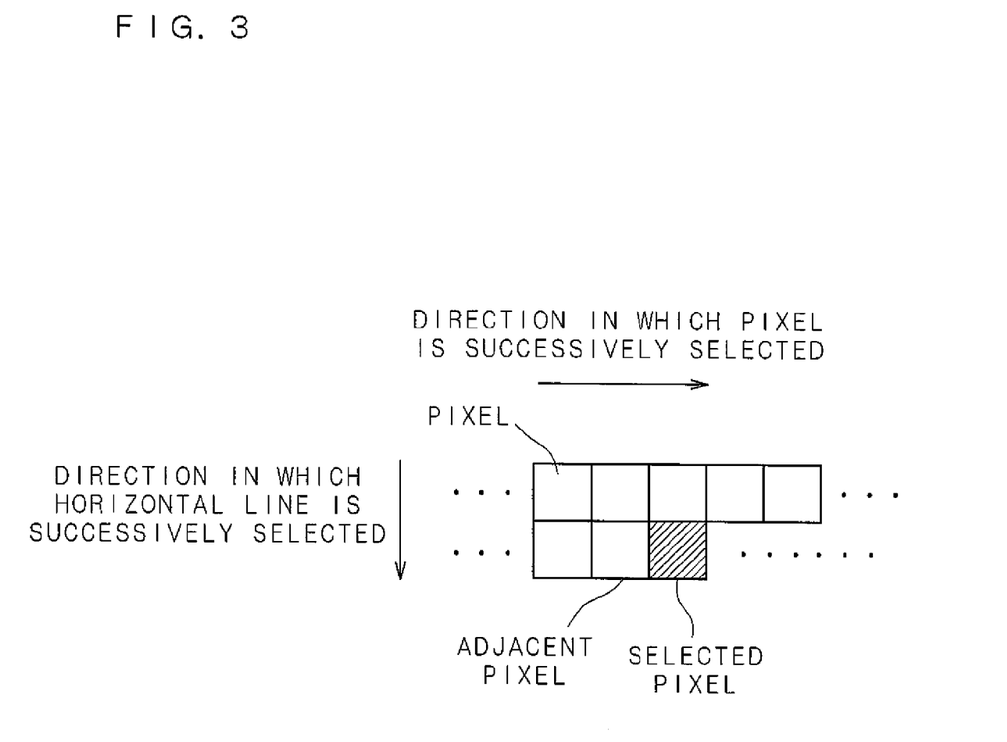
FIG. 3 is a conceptual view showing a selected pixel.

Next, the following will explain an image processing method executed by the image processing apparatus 1 having the above-described structure. The image processing apparatus 1 stores image data inputted to the input section 10 into the image data storing section 11, successively selects each of the pixels contained in an image represented by the image data, and performs the process of reducing the number of gray levels representing the pixel value of the selected pixel. FIG. 3 is a conceptual view showing a selected pixel. The image processing apparatus 1 successively selects a horizontal line from the top, successively selects each of the pixels included in the selected horizontal line from the left and performs the process. When the process is completed on all the pixels included in the selected horizontal line, the image processing apparatus 1 selects the next horizontal line.

In order to execute processing according to this embodiment, the numerical values included in the numerical matrix stored in the numerical matrix storing section 15 correspond to the pixels contained in the image represented by the image data. More specifically, when the size of the numerical matrix is 128×128, positions on the image and the numerical matrix are indicated by (X, Y), X, Y≦1, and integers i and j are 1≦i, and j≦128, then the numerical value at a position (i, j) on the numerical matrix corresponds to the pixel at a position (i, j) on the image. Further, supposed that integers h and k are 1≦h, k, then the numerical value at a position (i, j) on the numerical matrix corresponds to the pixel at a position (128h+i, 128k+j) on the image.

Figure 4:
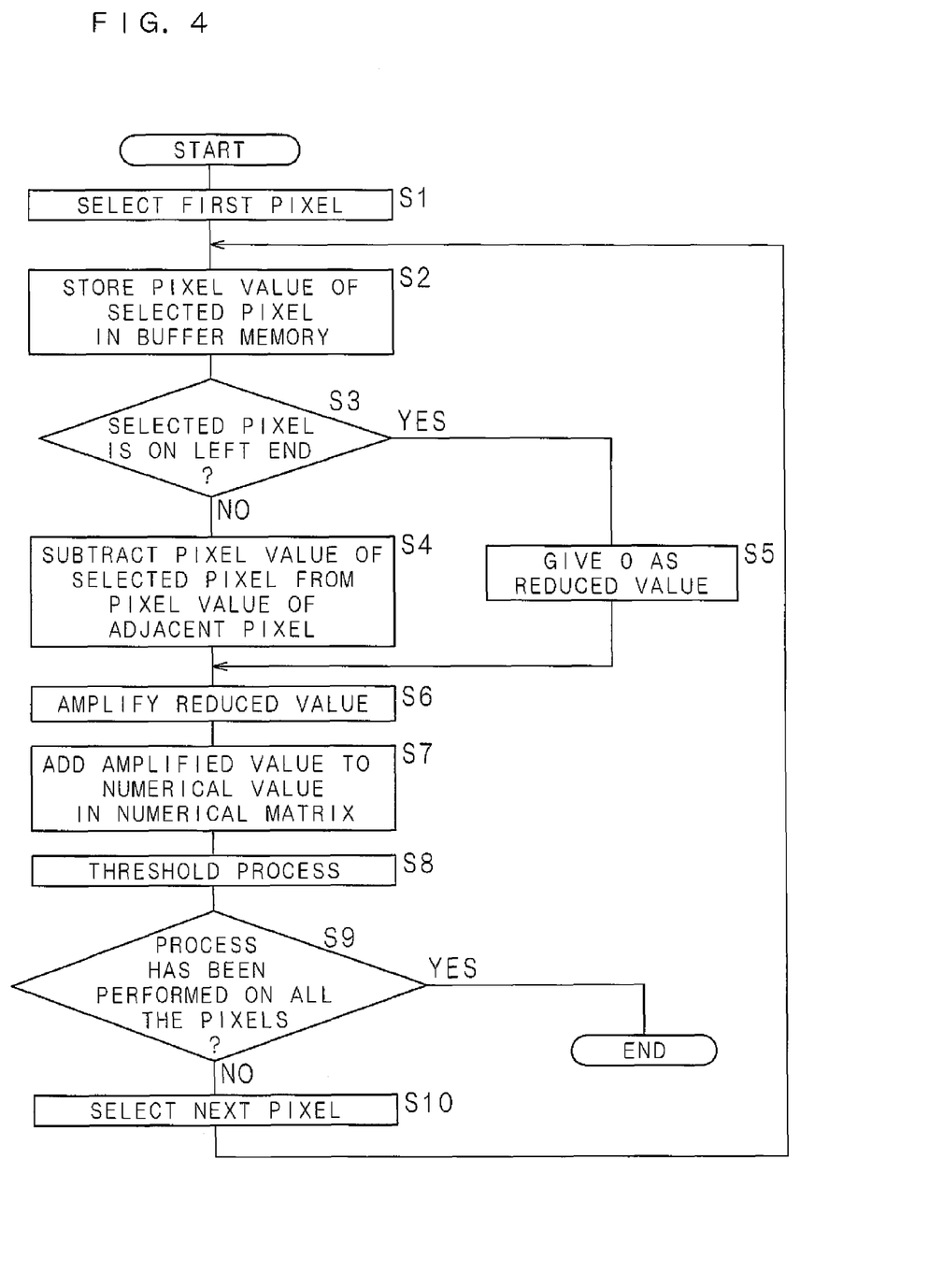
FIG. 4 is a flowchart showing the processing steps to be executed by the image processing apparatus.

FIG. 4 is a flowchart showing the processing steps to be executed by the image processing apparatus 1. First, the calculation process section 12 selects the first pixel among the pixels contained in the image represented by image data stored in the image data storing section 11 (S1), and stores the pixel value of the selected pixel, which is the pixel selected, into the buffer memory (S2). Next, the calculation process section 12 determines whether the selected pixel is the pixel located on the left end of the image (S3). If the selected pixel is not located on the left end of the image (S3: NO), the calculation process section 12 calculates a reduced value by subtracting the pixel value of the selected pixel from the pixel value of adjacent pixel located on the left of the selected pixel as shown in FIG. 3 (S4). At this time, if the position of the selected pixel in the X direction is X, the pixel value of the selected pixel is idat [X], the data stored in the buffer memory is buffer [X] and the reduced value is Sa[X], then the value of the reduced value Sa is given by the equation Sa [X]=buffer [X−1]−idat [X]. If the selected pixel is located on the left end of the image in step S3 (S3: YES), the calculation process section 12 gives 0 as the reduced value (S5).

After finishing step S4 or step S5, the calculation process section 12 outputs the calculated reduced value to the amplifying section 13, and the amplifying section 13 amplifies the reduced value at a predetermined amplification rate (S6). Next, the amplifying section 13 outputs the amplified value to the adding section 14, and the adding section 14 reads the numerical matrix from the numerical matrix storing section 15 and adds the amplified value to a numerical value in the numerical matrix (S7). Note that the adding section 14 can read a numerical value corresponding to the selected pixel from the numerical matrix and add the amplified value to the read numerical value.

The adding section 14 outputs the value obtained by adding the amplified value to the numerical value in the numerical matrix to the threshold process section 16, and the threshold process section 16 performs a threshold process on the pixel value of the selected pixel, based on the value obtained by adding the amplified value to the numerical value in the numerical matrix corresponding to the selected pixel (S8). In this process, the threshold process section 16 finds a pixel value of output image data by performing the process of reducing the number of gray levels representing the pixel value by using, as a threshold, a value obtained by further adding to a predetermined threshold a value obtained by adding the amplified value to the numerical value in the numerical matrix corresponding to the selected pixel.

More specifically, if a pixel value in the image data is Pi (X, Y) and a pixel value in the output image data is Po (X,Y), then the threshold process section 16 uses 43, 128 and 213 as predetermined thresholds and generates a pixel value Po (X, Y) of 0, 85, 170, or 255 in the output image data, based on the following conditions, for a pixel value Pi (X, Y) in the image data where 0≦Pi (X, Y)≦255.

If 0≦Pi (X, Y)<43+(the numerical value in the numerical matrix corresponding to the pixel+the amplified value),
then Po (X, Y)=0.

If 43+(the numerical value in the numerical matrix corresponding to the pixel+the amplified value)≦Pi (X, Y)<128+(the numerical value in the numerical matrix corresponding to the pixel+the amplified value),
then Po (X, Y)=85.

If 128+(the numerical value in the numerical matrix corresponding to the pixel+the amplified value)≦Pi (X, Y)<213+(the numerical value in the numerical matrix corresponding to the pixel+the amplified value),
then Po (X, Y)=170.

If 213+(the numerical value in the numerical matrix corresponding to the pixel+the amplified value)≦Pi (X, Y)≦255,
then Po (X, Y)=255.

Next, the threshold process section 16 outputs the generated pixel value Po (X, Y) to the output image data storing section 17, the output image data storing section 17 stores the pixel value Po (X, Y), and the calculation process section 12 determines whether or not the process has been performed on all the pixels contained in the image represented by the image data (S9). If there are pixels on which the process has not been performed (S9: NO), the calculation process section 12 selects the next pixel (S10), and returns the processing to step S2. If the process has been performed on all the pixels (S9: YES), the output image data storing section 17 stores the output image data including the generated pixel values Po (X, Y), and the image processing apparatus 1 completes the process of the image processing method.

After completing the above-described process, the image processing apparatus 1 outputs the generated output image data from the output section 18. An image is formed based on the outputted output image data by the image forming section in the apparatus incorporating the image processing apparatus 1, or an external printer.

As described in detail above, when performing the threshold process on a pixel value, the image processing apparatus 1 adds an amplified value obtained by amplifying a reduced value obtained by subtracting the pixel value of a selected pixel from the pixel value of adjacent pixel to the numerical value in the numerical matrix, further adds the value obtained by adding the amplified value to the numerical value in the numerical matrix to a predetermined threshold, and performs the threshold process by using the resulting value as a threshold. Since the difference between the pixel values of the selected pixel and adjacent pixel is reflected in the threshold, if the difference between the pixel values is large, the threshold changes largely, and thus there is a high possibility that the large difference between the pixel values is maintained even after the reduction of the number of gray levels. For example, when the pixel value of the selected pixel is increased more than adjacent pixel, the reduced value is negative, the threshold level decreases, and therefore there is a high possibility that the pixel value after the reduction of the number of gray levels by the threshold process is higher than the pixel value of adjacent pixel. On the other hand, when the pixel value of the selected pixel is decreased more than adjacent pixel, the reduced value is positive, the threshold level increases, and therefore there is a high possibility that the pixel value after the reduction of the number of gray levels by the threshold process is lower than the pixel value of adjacent pixel.

A portion where the difference between the pixel values of the selected pixel and adjacent pixel is large in the image is an edge portion contained in the image. Therefore, if the large difference between the pixel values is maintained even after the reduction of the number of gray levels, it is possible to suppress occurrence of blurriness and distortion of the edge even after the reduction of the number of gray levels. Consequently, the reproducibility of edges contained in the image formed based on the generated output image data is improved. Moreover, since the reduction of the number of gray levels is performed without using an error diffusion method, it is possible to reduce the amount of memory or the calculation time necessary for forming an image with improved edge reproducibility, and thus it is possible to form a high-quality image at low costs or in a short time.

Moreover, with the use of a blue noise mask having blue noise characteristics as the numerical matrix for locally changing the threshold from a predetermined threshold, it becomes difficult to perceive frequency components contained in the spatial distribution of the threshold with the naked eye. Thus, periodic noise is hard to observe from the spatial distribution of the pixel values contained in the image formed by reducing the number of gray levels, and it is possible to form a high-quality image.

Note that although this embodiment illustrates an example including a process in which a reduced value is calculated by subtracting the pixel value of the selected pixel from the pixel value of adjacent pixel in step S4 and the reduced value is amplified in step S6, the specific process for reflecting the difference between the pixel values in the threshold is not limited to this. For example, the calculation process section 12 can calculate the differential value between the pixel value of the selected pixel and the pixel value of adjacent pixel in step S4, and the amplifying section 13 can perform the process of amplifying the differential value at a negative amplification rate in step S6. Even in this case, it is possible to exhibit the effect of maintaining the large difference between the pixel values.

Further, although this embodiment illustrates an example in which the amplifying section 13 is used as the converting means, the present invention is not limited to this, and it is possible to construct an example in which the converting means converts into an amplified value by processing using a predetermined function such as linear function or quadric function with respect to the value of the difference between the pixel values, instead of performing simple amplification. Besides, although this embodiment illustrates an example in which the processing is performed by successively selecting each of the pixels from the left end of the image, it is possible to construct an example in which the image processing apparatus 1 executes the processing by successively selecting each of the pixels from the right end of the image, or an example in which the image processing apparatus 1 executes the processing by selecting each of the pixels in the vertical direction.

Additionally, in this embodiment, although the image data is represented by 256 gray levels and the output image data is represented by four gray levels, the number of gray levels of the image data and the output image data can take any value if the number of gray levels of the output image data is smaller than that of the image data. For the predetermined thresholds used in step S8, thresholds are determined in advance according to the number of gray levels of output image data. Moreover, it is possible to construct an example where, in order to generate output image data of two gray levels, the image processing apparatus 1 executes the threshold process in step S8 by using a value obtained by adding the amplified value to the numerical value in the numerical matrix as a threshold.

Embodiment 2

Figure 5:
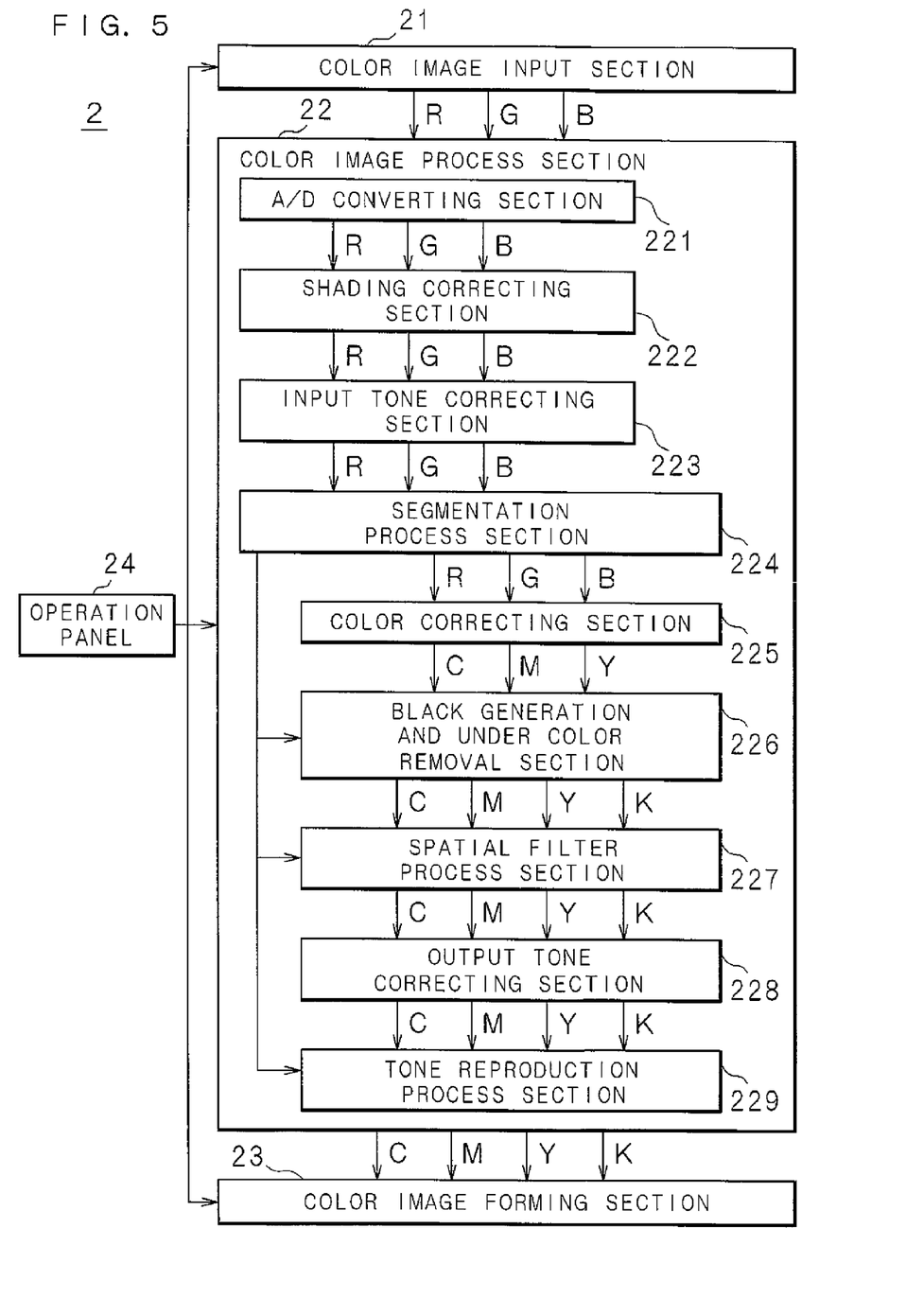
FIG. 5 is a block diagram showing the internal functional structure of an image processing apparatus according to Embodiment 2.

Embodiment 2 illustrates an embodiment in which the image processing apparatus is an image forming apparatus for forming color images. FIG. 5 is a block diagram showing the internal functional structure of an image processing apparatus 2 according to Embodiment 2. The image processing apparatus 2 comprises a color image input section 21 for reading a color image, and a color image process section 22 for performing the process of generating output image data necessary for forming a color image according to a read color image. The color image process section 22 is connected to the color image input section 21. Also connected to the color image process section 22 is a color image forming section 23 for forming a color image based on the output image data generated by color image process section 22. An operation panel 24 for receiving operations from a user is connected to the color image input section 21, color image process section 22 and color image forming section 23. Further, the image processing apparatus 2 comprises a controller, not shown, for controlling the operations of the respective sections constituting the image processing apparatus 2.

The color image input section 21 is composed of a scanner comprising a CCD (Charge Coupled Device), decomposes a reflected optical image from a color image formed on a record carrier such as paper into RGB, reads them with the CCD, converts them into R (red), G (green) and B (blue) analog signals and outputs them to the color image process section 22. The color image process section 22 performs later-described image processing on the RGB analog signals inputted from the color image input section 21 to generate image data composed of digital C (cyan), M (magenta), Y (yellow) and K (black) signals and further generates output image data by reducing the number of gray levels of the image data and outputs it to the color image forming section 23. The color image forming section 23 forms a color image by a method, such as a thermal transfer, electrophotographic or inkjet method, based on the output image data inputted from the color image process section 22. The operation panel 24 includes a display section such as a liquid crystal display for displaying information necessary for operating the image processing apparatus 2, and a receiving section such as a touch panel or ten-key for receiving an instruction to control the operation of the image processing apparatus 2 through the operation of the user.

The color image process section 22 converts the analog signals inputted from the color image input section 21 into digital signals by an A/D converting section 221, sends them to a shading correcting section 222, an input tone correcting section 223, a segmentation process section 224, a color correcting section 225, a black generation and under color removal section 226, a spatial filter process section 227, an output tone correcting section 228, and a tone reproduction process section 229 in this order to output the output image data composed of digital CMYK signals to the color image forming section 23.

The A/D converting section 221 receives the RGB analog signals inputted to the color image process section 22 from the color image input section 21, converts the RGB analog signals into digital RGB signals, and inputs the RGB signals to the shading correcting section 222.

The shading correcting section 222 performs the process of removing various kinds of distortions caused in the lighting system, focusing system and image sensing system of the color image input section 21 on the RGB signals inputted from the A/D converting section 221. Next, the shading correcting section 222 outputs the RGB signals without distortions to the input tone correcting section 223.

The input tone correcting section 223 adjusts the color balance of the RGB signals inputted from the shading correcting section 222. Further, the RGB signals inputted from the shading correcting section 222 to the input tone correcting section 223 are RGB reflectance signals, and the input tone correcting section 223 converts the RGB signals inputted from the shading correcting section 222 into density signals or other signals that are easily processed by an image processing method performed by the color image process section 22. Next, the input tone correcting section 223 inputs the processed RGB signals to the segmentation process section 224.

The segmentation process section 224 classifies each of the pixels in the image represented by the RGB signals inputted from the input tone correcting section 223 as a text region, a halftone region, or a photograph region, and outputs a segmentation class signal indicating to which region the pixel belongs to the black generation and under color removal section 226, spatial filter process section 227 and tone reproduction process section 229, based on the classification result. The segmentation process section 224 also outputs the RGB signals inputted from the input tone correcting section 223 to the color correcting section 225.

The color correcting section 225 converts the RGB signals inputted from the segmentation process section 224 into CMY signals, and performs the process of removing color impurity from the CMY signals based on the spectral characteristics of the CMY color materials containing unnecessary absorption elements to realize faithful color reproduction. Next, the color correcting section 225 outputs the color-corrected CMY signals to the black generation and under color removal section 226.

The black generation and under color removal section 226 performs a black generation process for generating a K signal from three color signals of CMY inputted from the color correcting section 225, and converts the three color signals of CMY into four color signals of CMYK by subtracting the K signal obtained by the black generation process from the original CMY signals.

One example of the black generation process is a method of generating black with a skeleton black. In this example, suppose that the input and output characteristics of a skeleton curve is y=f(x), data before conversion are C, M and Y, and the UCR (Under Color Removal) rate is $\alpha$ ($0<\alpha<1$). Then, data C', M', Y' and K' after conversion are expressed as the following equations.

$$K'=f(\min(C,M,Y))$$

$$C'=C-\alpha K'$$

$$M'=M-\alpha K'$$

$$Y'=Y-\alpha K'$$

Here, the UCR rate $\alpha$ ($0<\alpha<1$) indicates how much the CMY are reduced by replacing a portion where CMY are superimposed with K. The above-mentioned first equation indicates that the K signal is generated according to the smallest signal intensity among the signal intensities of CMY. Next, the black generation and under color removal section 226 outputs the CMYK signals obtained by converting the CMY signals to the spatial filter process section 227.

The spatial filter process section 227 performs the process of improving blurriness or granular deterioration of the image with respect to the image represented by the CMYK signals inputted from the black generation and under color removal section 226. Next, the spatial filter process section 227 outputs the processed CMYK signals to the output tone correcting section 228.

The output tone correcting section 228 performs an output tone correction process for converting the CMYK signals inputted from the spatial filter process section 227 into the dot area percent that is the characteristic value of the color image forming section 23, and outputs the CMYK signals after the output tone correction process to the tone reproduction process section 229.

The tone reproduction process section 229 performs the process of generating output image data represented by a reduced number of gray levels of the image data composed of the CMYK signals inputted from the output tone correcting section 228. The tone reproduction process section 229 executes a process similar to the image processing method shown in FIG. 4 of Embodiment 1 on the respective CMYK colors by using hardware or software. More specifically, the tone reproduction process section 229 generates output image data by reducing the number of gray levels of each of the CMYK colors to four gray levels etc. by the image processing method and outputs the generated output image data to the color image forming section 23.

The color image forming section 23 forms a CMYK color image on a record carrier, such as paper, based on the output image data composed of the CMYK signals inputted from the color image process section 22. With the above-mentioned structure, the image processing apparatus 2 according to Embodiment 2 functions as a copying machine for copying color images.

As described in detail above, even in this embodiment, similarly to Embodiment 1, it is possible to generate output image data represented by a reduced number of gray levels of the image data by using the image processing method and form an image based on the generated output image data. Hence, in this embodiment, it is possible to suppress occurrence of blurriness and distortion of edges even after the reduction of the number of gray levels, and it is possible to form an image with improved edge reproducibility.

Note that although the image processing apparatus 2 according to this embodiment is an example comprising the color image input section 21 that is a scanner for reading a color image, the present invention is not limited to this, and it is possible to construct an example comprising, as the color image input section 21, an interface for receiving image data transmitted from an external PC or scanner.

Embodiment 3

Figure 6:
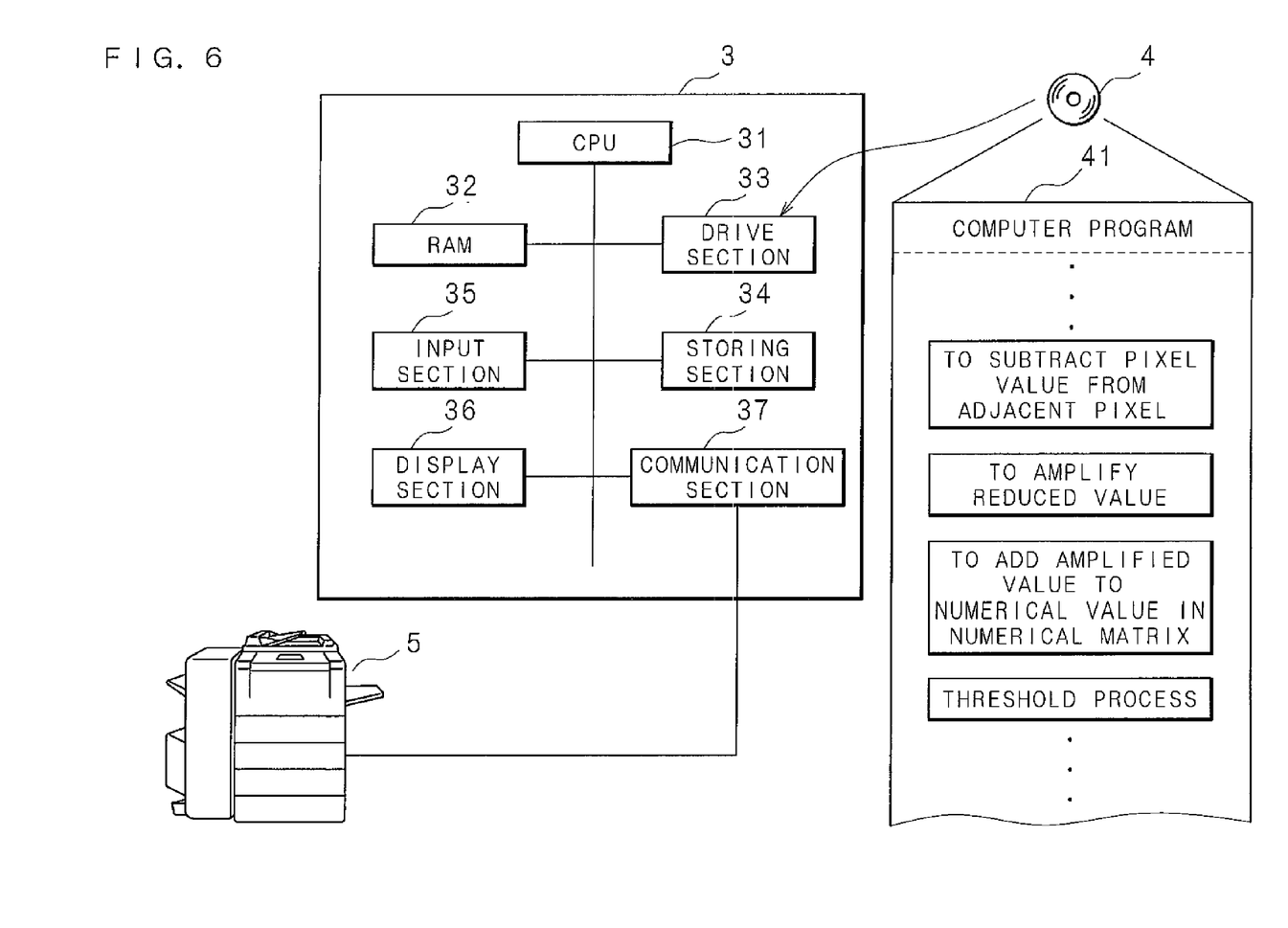
FIG. 6 is a block diagram showing the internal structure of an image processing apparatus according to Embodiment 3.

Embodiment 3 illustrates an embodiment in which an image processing apparatus is realized using a general-purpose computer. FIG. 6 is a block diagram showing the internal structure of an image processing apparatus 3 according to Embodiment 3. The image processing apparatus 3 according to this embodiment is composed of a general-purpose computer such as a PC, and comprises a CPU 31 for performing operations, a RAM 32 for storing temporary information generated by operations, a drive section 33 such as a CD-ROM drive for reading information from a recording medium 4 such as an optical disk, and a storing section 34 such as a hard disk. The CPU 31 causes the drive section 33 to read a computer program 41 from the recording medium 4 and causes the storing section 34 to store the read computer program 41. The computer program 41 is loaded into the RAM 32 from the storing section 34 as needed, and the CPU 31 causes the image processing apparatus 3 to execute necessary processing based on the loaded computer program 41.

Moreover, the image processing apparatus 3 comprises an input section 35 such as a keyboard and a pointing device through which information such as various processing instructions are inputted by the operation of a user, and a display section 36 such as a liquid crystal display for displaying various kinds of information. Further, the image processing apparatus 3 comprises a communication section 37 connected to an external image forming apparatus 5, and the communication section 37 transmits data necessary for the image forming section 5 to form an image.

The storing section 34 stores a numerical matrix as shown in FIG. 2 in advance, or stores a numerical matrix when the CPU 31 causes the drive section 33 to read a numerical matrix recorded in the recording medium 4. The computer program 41 is a part of a driver program for causing the image forming apparatus 5 to form an image. The CPU 31 loads the driver program including the computer program 41 into the RAM 32 and causes the image forming apparatus 5 to execute the process of forming an image, according to the loaded driver program. More specifically, the CPU 31 loads the numerical matrix into the RAM 32 as needed, executes a process similar to the image processing method shown in FIG. 4 of Embodiment 1 on gray level image data generated using an image processing application program for image generation or image display so as to generate output image data represented by a reduced number of gray levels, and causes the communication section 37 to transmit the generated output image data to the image forming apparatus 5. The image forming apparatus 5 forms an image based on the output image data transmitted from the image processing apparatus 3.

As described above, in this embodiment, similarly to Embodiment 1, it is also possible to generate output image data represented by a reduced number of gray levels of the image data by using the image processing method and form an image based on the generated output image data. Thus, in this embodiment, it is possible to suppress occurrence of blurriness and distortion of edges even after the reduction of the number of gray levels, and it is possible to form an image with improved edge reproducibility.

Note that although this embodiment illustrates an example in which the CPU 31 of the image processing apparatus 3 executes a process similar to the image processing method shown in FIG. 4 of Embodiment 1, that is, the process performed by the tone reproduction process section 229 of Embodiment 2, the present invention is not limited to this. In other words, it is possible to construct an example in which the CPU 31 of the image processing apparatus 3 executes, in addition to the above-mentioned process, a part or all of the processes performed by the shading correcting section 222, input tone correcting section 223, segmentation process section 224, color correcting section 225, black generation and under color removal section 226, spatial filter process section 227, and output tone correction section 228 of Embodiment 2, according to the computer program 41.

Moreover, the present invention is not limited to the example in which the computer program 41 is included in the driver program, and it is possible to construct an example in which the computer program 41 is included in an image processing application program. It is also possible to construct an example in which the computer program 41 includes a numerical matrix for use in the image processing method of this embodiment. In this case, when loading the computer program 41 into the RAM 32, the CPU 31 loads the numerical matrix included in the computer program 41 and executes the process of the image processing method of this embodiment.

Further, the recording medium 4 in which the computer program 41 is recorded can be in the form of any of a magnetic tape, a magnetic disk, a removable hard disk, an optical disk such as a CD-ROM, MO, MD, and DVD, or a card type recording medium such as an IC card (including memory card) and an optical card. Also, the recording medium 4 can be a semiconductor memory, such as a mask ROM, EPROM (Erasable Programmable Read Only Memory), EEPROM (Electrically Erasable Programmable Read Only Memory) and flash ROM, which is installed in the image processing apparatus 3, and the recorded contents of the recording medium 4 is readable by the CPU 31.

It is also possible to construct an example in which the computer program 41 is downloaded into the image processing apparatus 3 from an external server, not shown, connected to the image processing apparatus 3 through a communication network such as the Internet or LAN, and stored in the storing section 34. In this example, a program required for downloading the computer program 41 is stored in the storing section 34 in advance, or read from a predetermined recording medium by using the drive section 33 and then stored in the storing section 34 and loaded into the RAM 32 as needed.

As this description may be embodied in several forms without departing from the spirit of essential characteristics thereof, the present embodiments are therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. An image processing method for performing image processing for reducing the number of gray levels of image data, comprising the steps of:

storing a numerical matrix composed of predetermined numerical values which are arranged in a matrix form and correspond to pixels, respectively, which are arranged in an image represented by the image data;

selecting successively each of the pixels in the image represented by the image data;

calculating a difference between a pixel value of a selected pixel and a pixel value of a pixel adjacent to the selected pixel in a predetermined direction;

converting the calculated difference by a predetermined conversion method;

adding the converted value to a numerical value in the numerical matrix corresponding to the selected pixel; and processing the pixel value of the selected pixel based on a value obtained by the addition to find a pixel value represented by a reduced number of gray levels for the pixel value.

2. The image processing method according to claim 1, wherein the step of finding a pixel value is performed based on a value obtained by further adding a predetermined value to a value obtained by the addition.

3. An image processing apparatus for generating output image data represented by a reduced number of gray levels of image data, comprising:

a storing section for storing a numerical matrix composed of predetermined numerical values which are arranged in a matrix form and correspond to pixels, respectively, which are arranged in an image represented by the image data;

a calculating section for selecting successively each of the pixels in the image represented by the image data and calculating a difference between a pixel value of a selected pixel and a pixel value of a pixel adjacent to the selected pixel in a predetermined direction;

a converting section for converting the difference calculated by the calculating section by a predetermined conversion method;

an adding section for adding a converted value given by the converting section to a numerical value in the numerical matrix corresponding to the selected pixel; and a processing section for processing the pixel value of the selected pixel based on a value obtained by the addition to find a pixel value in output image data represented by a reduced number of gray levels of the pixel values.

4. The image processing apparatus according to claim 3, wherein said processing section finds a pixel value, based on a value obtained by further adding a predetermined value to a value obtained by the addition.

5. The image processing apparatus according to claim 3, wherein said calculating section calculates the difference by subtracting the pixel value of the selected pixel from the pixel value of the adjacent pixel, and said converting section converts the difference calculated by said calculating section by amplifying the difference at a predetermined amplification rate.

6. The image processing apparatus according to claim 3, wherein a spatial distribution of the numerical values arranged in the numerical matrix has blue noise characteristics.

7. The image processing apparatus according to claim 3, further comprising an image forming section for forming an image based on the generated output image data.

8. An image processing apparatus for generating output image data represented by a reduced number of gray levels of image data, comprising:
- means for storing a numerical matrix composed of predetermined numerical values which are arranged in a matrix form and correspond to pixels, respectively, which are arranged in an image represented by the image data;
- means for selecting successively each of the pixels in the image represented by the image data;
- calculating means for calculating a difference between a pixel value of a pixel selected by said means for selecting and a pixel value of a pixel adjacent to the selected pixel in a predetermined direction;
- converting means for converting the difference calculated by the calculating means by a predetermined conversion method;
- means for adding a converted value given by the converting means to a numerical value in the numerical matrix corresponding to the selected pixel; and
- processing means for processing the pixel value of the selected pixel based on a value obtained by the addition to find a pixel value in output image data represented by a reduced number of gray levels of the pixel values.

9. The image processing apparatus according to claim 8, wherein said processing means finds a pixel value, based on a value obtained by further adding a predetermined value to a value obtained by the addition.

10. The image processing apparatus according to claim 8, wherein said calculating means calculates the difference by subtracting the pixel value of the selected pixel from the pixel value of the adjacent pixel, and
- said converting means converts the difference calculated by said calculating means by amplifying the difference at a predetermined amplification rate.

11. The image processing apparatus according to claim 8, wherein a spatial distribution of the numerical values arranged in the numerical matrix has blue noise characteristics.

12. The image processing apparatus according to claim 8, further comprising means for forming an image based on the generated output image data.

13. A non-transitory recording medium readable by a computer and storing a computer program for causing a computer, which stores a numerical matrix composed of predetermined numerical values arranged in a matrix form and correspond to pixels, respectively, which are arranged in an image represented by image data, to generate output image data represented by a reduced number of gray levels of the image data, the computer program performing a method comprising:
- a step of causing the computer to select successively each of the pixels in the image represented by the image data;
- a step of causing the computer to calculate a difference between a pixel value of a selected pixel and a pixel value of a pixel adjacent to the selected pixel in a predetermined direction;
- a step of causing the computer to convert the calculated difference by a predetermined conversion method;
- a step of causing the computer to add the converted value to a numerical value in the numerical matrix corresponding to the selected pixel; and
- a step of causing the computer to process the pixel value of the selected pixel based on a value obtained by the addition to find a pixel value in output image data represented by a reduced number of gray levels of the pixel values.

14. The recording medium according to claim 13, wherein the step of finding a pixel value is performed based on a value obtained by further adding a value obtained by the addition to a predetermined value.

* * * * *